Patented May 9, 1939

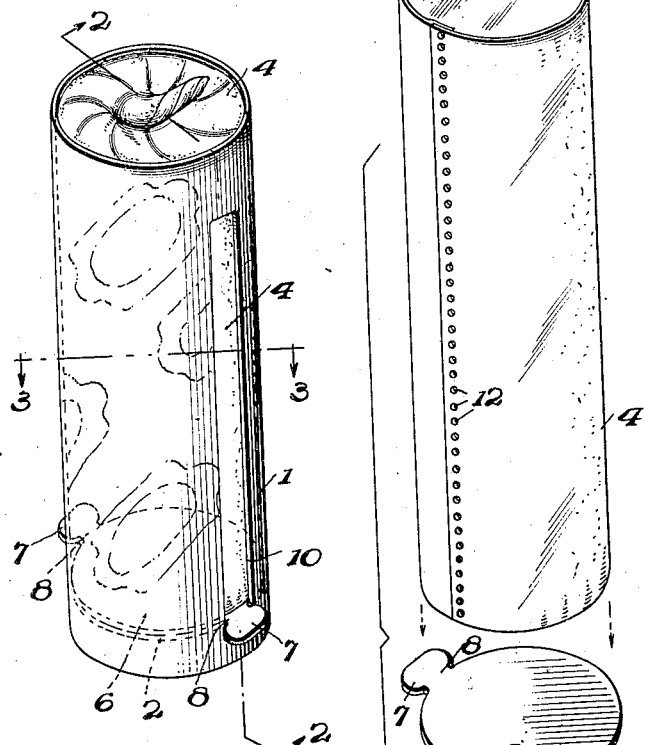
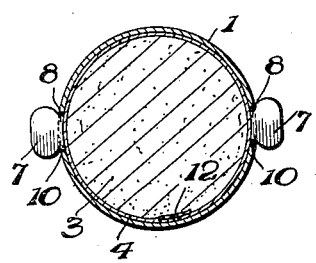
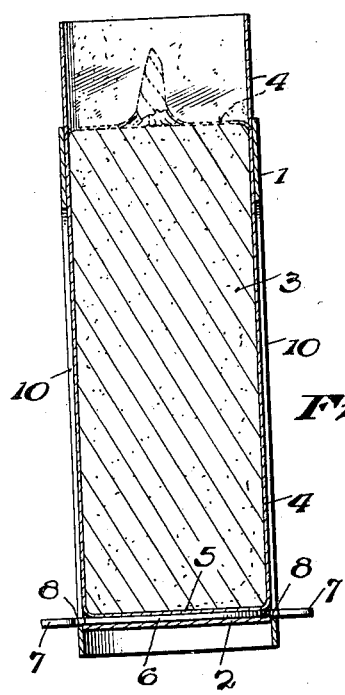
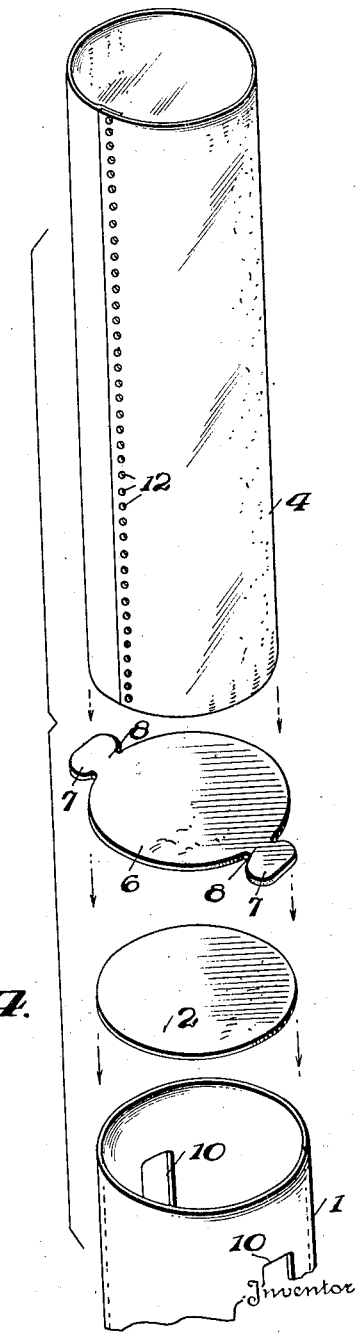

2,157,476

UNITED STATES PATENT OFFICE 2,157,476

DISPENSING CONTAINER

Roman A. Brodesser, Chevy Chase, Md.

Application June 2, 1937, Serial No. 146,069

2 Claims. (Cl. 220—56)

This invention relates broadly to the packaging of comestibles and, more particularly, has to do with the packaging of frozen confections, such as ice cream, in small quantities for individual consumption.

It has heretofore been proposed to provide a container for a small quantity of ice cream, together with means for extruding the ice cream from the container as it is being eaten. Various types and constructions of devices for engaging and moving the mass of ice cream from the container have been proposed and manufactured. All of these have, however, been subject to the disadvantage of having relatively complicated structures, whereby the difficulty and cost of manufacture were increased, and the further disadvantage that their structures did not permit a quick and easy filling operation or proper and compact packaging. Further, in the filling and packaging of prior art devices it has been impossible to prevent the ice cream or other foodstuff from coming into contact with the hands of the operator and with various unsterilized parts of the container. This has been decidedly undesirable from the standpoint of preventing any bacterial contamination of the food product.

It has therefore been an object of this invention to provide a container adapted to receive a single serving or small quantity of a comestible product, such as ice cream, and embodying means of novel construction and arrangement for moving the food product progressively out of the container as it is eaten, such means for moving the ice cream being so constructed and arranged that considerable advantages in ease of operation, filling and packaging are obtained.

A further object of the invention is to provide a container for an individual serving of ice cream which is so constructed and arranged that the ice cream will not be touched by the container or by the hands of the operator in the filling or packaging operations, whereby any possibility of bacterial contamination will be prevented.

Other objects and features of novelty will be apparent from the following description and the annexed drawing, it being expressly understood, however, that such description and drawing are only illustrative of the invention which is not limited to the embodiment described and disclosed but only by the appended claims.

Referring to the drawing, in which similar reference numerals refer to like parts:

Fig. 1 is a perspective view of a device formed according to the present invention;

Fig. 2 is a sectional view taken on the line 2—2 of Fig. 1;

Fig. 3 is a sectional view taken on the line 3—3 of Fig. 1, and

Fig. 4 is an exploded view showing the relation of the various parts of a container device formed according to the present invention.

In accordance with the present invention I propose to provide a container or package for ice cream or the like which is of such size and shape that it may be easily held in the hand while the ice cream contained therein is being consumed. Within this container I provide a brick or tube of ice cream which may be slidably moved relatively to the exterior package in order to progressively advance the ice cream from the container as it is eaten. In order to facilitate the extrusion of the ice cream from the container I have provided a new and improved construction comprising a follower disposed within the container and beneath the brick or tube of ice cream and having means extending outwardly through slots or apertures in the walls of the container whereby the follower and the ice cream disposed above it may be moved with respect to the container.

Referring to the drawing, wherein there is disclosed one form which the invention may take, it will be seen that I have provided a container I which is of relatively greater length than diameter and which is preferably circular in cross section, although it will be clearly understood that a container which is of rectangular or any other desired cross section may be employed. This container preferably comprises a cylindrical tube which is formed of a suitable material such as cardboard and the ends of which are normally open. This tube may be prepared and formed in any desired manner. One end of this tube is closed by means of a closure member 2 which, in the present embodiment of the invention, is formed as a cardboard disk. This closure member is arranged adjacent the lower end of the tube I and may be held therein by forcing the disk into the tube and waxing the same to the interior walls of the tube. The engagement between the closure and the tube is facilitated and strengthened by making the disk of slightly greater diameter than the internal diameter of the tube.

Means are provided by the invention for receiving and holding internally of the tube I a brick or cylindrical block 3 of a comestible food product, such as ice cream, which is preferably of such dimensions and quantity that it provides an individual serving. In order to completely house the ice cream block 3 and to insulate the same from the container 1 and from any possible contact with the hands of the operator in the filling or packaging operation, I provide interiorly of the tube 1 a bag or wrapper 4 the bottom 5 of which is closed and rests upon the upper surface of a follower device 6, to be described more fully hereinafter, which preferably rests upon and is supported by the upper surface of the end closure member 2. The bag or container 4 is preferably formed of some light and strong material such, for example, as Cellophane or paper and is of such dimensions that it snugly fits the interior of the tube 1. This bag is formed of such length that when the bottom 5 thereof rests upon the follower member 6 the upper open end of the bag extends considerably above the upper end of the tube 1. It will be apparent that if the entire device, as hereinbefore described, and with the bag 4 within the tube 1, is placed in an upright position with the upper end of the bag open, a quantity of ice cream or other food product may be inserted or discharged into the container 4 in order to fill the same approximately to the upper edge of the tube 1. After this has been done the upper end of the bag 4, which extends above the upper end of the tube 1, may be twisted by the operator in order to close the end thereof and protect the ice cream therein from possible contact with external members. It will be seen that there is thus provided an individual serving of ice cream which is securely packed in a container device but which is completely isolated from the container and which need not be touched in any way during the filling or packaging operation.

Means are provided by this invention for progressively extruding the brick or tube 3 of ice cream from the tube as the same is being eaten. In order to effect this, I provide in diametrically opposed portions of the tube 1 the elongated slots or apertures 10 which extend longitudinally of the tube and which preferably terminate adjacent the ends thereof. Arranged interiorly of the tube 1 is the follower member 6 which is of generally circular shape and is of such a diameter as to slidably fit within the tube 1 and which may, if desired, be attached to the bottom of the bag 4. This follower member is provided with two ears 7 which extend from diametrically opposed portions of the disk 6 and which are connected to the disk 6 by reduced portions 8. The reduced portions 8 are of approximately the same width as the slots or apertures 10 in the tube 1 and the ears 7 are disposed externally of the tube 1 as clearly illustrated in the drawing. In its normal position, the follower member 6 rests upon or is disposed slightly above the upper surface of the end of closure member 2, the length of the slots 10 being so proportioned and arranged with respect to the position of the end closure member that this relation between the follower 6 and the end closure member may be achieved. Further, when the invention is not in use, the lower end 5 of the bag or container 4 which receives the ice cream rests upon and is supported by the follower member 6. It will be apparent that the follower member 6, and in some constructions the end closure member 2, will provide a support for the bag 4 which must be provided at all times and particularly when the bag is being filled with the food product.

In the operation and use of the device disclosed, and of other devices formed according to this invention, the container 1 with the bag 4 therein is arranged in vertical position with the upper end of the bag 4 open. A proper quantity of ice cream or other food product is then discharged or inserted into the bag 4 and the upper end thereof which extends above the upper end of the tube 1 is then twisted or folded in order to close the bag and completely enclose the ice cream therein. In this condition the device may be packaged, transported, stored and folded. When it is desired to eat the substance within the bag 4, it will be seen that the bag and the substance therein must be moved progressively outwardly from the tube 1 in order to give to the user access to the food product within the bag. Such movement is effected by grasping either one or both of the ears 7 which are carried by the follower 6 and which protrude through the slots 10 in the tube 1 and by moving the disk 6 longitudinally of the tube a desired distance, thereby moving the bag 4 outwardly from the tube 1. The end of the bag may be unwrapped or untwisted and the bag may be torn from around the block of ice cream 3 in order that the user may eat as much thereof as is desired. If only a portion of the ice cream 3 is eaten at one time, the remainder may be returned to a position within the tube 1 by merely moving the follower 6 downwardly to thereby carry the bag 4 into the lower portion of the tube 1. It will be seen that when the follower member has been raised to the upper limit of the apertures 10, the remaining portion of ice cream within the container may be removed by turning the follower member to a position at right angles to its usual position. This movement of the follower member will cause the curved edge thereof to force the remaining ice cream out of the tube.

As illustrated in Fig. 4, the bag 1 may be provided with a line of perforations 12 extending longitudinally thereof and adapted to facilitate the tearing of the bag in gaining access to the ice cream therein.

While I have described and illustrated only a single embodiment of my invention, it will be understood by those skilled in the art that further embodiments thereof may be made and that improvements in the disclosed device may be effected without departing in any way from the spirit or scope of the invention. For example, instead of providing two diametrically-spaced apertures in the outer container, I may provide one or any number of such apertures, in which event the follower member which is slidably arranged within the container will be provided with a corresponding number of ear members. Further, instead of providing a disk-like closure member for the lower end of the tube, this member may be dispensed with entirely, in which event the slidable follower member may be supported by the lower ends of the slots in the outer container, or some other supporting member therefor may be provided. All of these and many other modifications may be practised without departing in any way from the spirit or scope of the invention, for the limits of which reference must be had to the appended claims.

What is claimed is:

1. A dispensing container comprising a cylindrical tube formed of bendable material, the wall of said tube being provided with parallel elongated slots which extend longitudinally of the tube at diametrically-opposed parts thereof and terminate adjacent the opposite ends thereof, a rigid follower member having a body portion slidably fitted within the tube and having diametrically opposed extensions thereon which extend exteriorly of the tube through said slots, said follower being normally supported by the end walls of said slots, and a flexible container member slidably disposed within and lining said tube and having a bottom portion resting upon the follower member and having a normally open upper end portion extending above the upper end of the tube, the container member being adapted to receive a food product, and the upper end of the container being adapted to be twisted or folded in order to completely enclose the food product within the container.

2. A dispensing container comprising a cylindrical tube formed of bendable material, the wall of said tube being provided with parallel elongated slots extending longitudinally of the tube at diametrically-opposed parts thereof and terminating adjacent the opposite ends of the tube, a disk-like follower member having a substantially circular body portion slidably fitted within the tube and having diametrically opposed extensions thereon which extend exteriorly of the tube through said slots, said follower being normally supported by said closure, and a flexible bag member slidably disposed within and lining said tube and having a bottom portion resting upon and attached to the follower member and having a normally open upper end portion extending above the upper end of the tube, the container member being adapted to receive a food product, and the upper end of the container being adapted to be twisted or folded in order to completely enclose the food product within the container.

ROMAN A. BRODESSER.